United States Patent
Tanaka

(10) Patent No.: US 12,319,849 B2
(45) Date of Patent: Jun. 3, 2025

(54) ADHESIVE COMPOSITION, ROOM-TEMPERATURE-CURABLE ADHESIVE, AND CURED OBJECT

(71) Applicant: KANEKA CORPORATION, Osaka (JP)

(72) Inventor: Hidenori Tanaka, Osaka (JP)

(73) Assignee: Kaneka Corporation, Osaka (JP)

( * ) Notice: Subject to any disclaimer, the term of this patent is extended or adjusted under 35 U.S.C. 154(b) by 179 days.

(21) Appl. No.: 18/274,365

(22) PCT Filed: Jan. 21, 2022

(86) PCT No.: PCT/JP2022/002172
§ 371 (c)(1),
(2) Date: Jul. 26, 2023

(87) PCT Pub. No.: WO2022/163523
PCT Pub. Date: Aug. 4, 2022

(65) Prior Publication Data
US 2024/0101878 A1  Mar. 28, 2024

(30) Foreign Application Priority Data

Jan. 28, 2021  (JP) .................. 2021-012360

(51) Int. Cl.
*C09J 171/02* (2006.01)
*C09J 11/06* (2006.01)

(52) U.S. Cl.
CPC .......... *C09J 171/02* (2013.01); *C09J 11/06* (2013.01); *C09J 2301/408* (2020.08); *C09J 2471/00* (2013.01)

(58) Field of Classification Search
CPC .... C09J 171/02; C09J 11/06; C09J 2301/408; C09J 2471/00; C09J 4/00; C08F 290/06; C08L 71/02
See application file for complete search history.

(56) References Cited

U.S. PATENT DOCUMENTS

2021/0403629 A1  12/2021  Serizawa

FOREIGN PATENT DOCUMENTS

| CN | 102015880 B | * | 1/2013 | .......... C08G 65/336 |
|---|---|---|---|---|
| JP | S59-84964 A | | 5/1984 | |
| JP | S60-219276 A | | 11/1985 | |
| JP | S61-148277 A | | 7/1986 | |
| JP | H03-26779 A | | 2/1991 | |
| JP | 2012-107140 A | | 6/2012 | |
| JP | 2012-122048 A | | 6/2012 | |
| JP | 2021-88632 A | | 6/2021 | |
| WO | 2020/100832 A1 | | 5/2020 | |

OTHER PUBLICATIONS

International Search Report issued in corresponding International Application No. PCT/JP2022/002172 dated Mar. 22, 2022 (4 pages).
International Preliminary Report on Patentability issued in corresponding International Application No. PCT/JP2022/002172 dated Mar. 22, 2022 (7 pages).

* cited by examiner

*Primary Examiner* — Daniel McNally
(74) *Attorney, Agent, or Firm* — Osha Bergman Watanabe & Burton LLP

(57) ABSTRACT

It is an object of the present invention to achieve an adhesive composition which enables provision of a cured product having excellent mechanical properties. In order to attain the foregoing object, an adhesive composition in accordance with an embodiment of the present invention contains: a polyoxypropylene-based polymer (A) which has, the terminal thereof, not less than 0.6 (meth)acryloyl groups on average and which has a number average molecular weight of not less than 5,000; a methacrylate compound (B) having a glass transition temperature of higher than 60° C. in a state of a homopolymer; an organic peroxide (C); and a reducing agent (D).

9 Claims, No Drawings

ADHESIVE COMPOSITION, ROOM-TEMPERATURE-CURABLE ADHESIVE, AND CURED OBJECT

TECHNICAL FIELD

The present invention relates to an adhesive composition, a room-temperature curing adhesive, and a cured product each of which contains a polyoxypropylene-based polymer.

BACKGROUND ART

A rubbery cured product is obtained by adding a polymerization initiator to an organic polymer having a (meth)acryloyl group, and then irradiating the organic polymer with an active energy ray, such as UV light and an electron ray, or heating the organic polymer to polymerize and cross-link the (meth)acryloyl group in the organic polymer.

Utilizing such a characteristic, an adhesive composition has been suggested which contains, as a main component, a polyoxyalkylene-based polymer having a (meth)acryloyl group (for example, Patent Literature 1). In addition, a technique has been suggested in which a curable composition containing, as a main component, a polyoxyalkylene-based polymer having a (meth)acryloyl group is cured to improve mechanical properties of a cured product (for example, Patent Literature 2).

CITATION LIST

Patent Literature

[Patent Literature 1]
Japanese Patent Application Publication Tokukai No. 2012-107140
[Patent Literature 2]
Japanese Patent Application Publication Tokukai No. 2012-122048

SUMMARY OF INVENTION

Technical Problem

The techniques disclosed in Patent Literatures 1 and 2 above have room for improvement in terms of mechanical properties (strength and elongation) of a resultant cured product. An embodiment of the present invention has been achieved in view of the foregoing problem. It is an object of the embodiment of the present invention to achieve an adhesive composition which may provide a cured product having excellent mechanical properties.

Solution to Problem

The inventors of the present invention conducted a diligent study in order to solve the foregoing problem and made the finding that a cured product having excellent mechanical properties is obtained by curing, through Redox radical reaction, a composition containing (i) a specific polyoxypropylene-based polymer having, at a terminal thereof, a (meth)acryloyl group and (ii) a methacrylate compound having a high glass transition temperature (Tg) in a state of a homopolymer. As a result, the inventors of the present invention have completed the present invention. That is, an aspect of the present invention includes the following configurations.

<1> An adhesive composition containing: a polyoxypropylene-based polymer (A) which has, at a terminal thereof, not less than 0.6 (meth)acryloyl groups on average and which has a number average molecular weight of not less than 5,000; a methacrylate compound (B) having a glass transition temperature of higher than 60° C. in a state of a homopolymer; an organic peroxide (C); and a reducing agent (D).

<2> The adhesive composition according to <1>, wherein the polyoxypropylene-based polymer (A) has a (meth)acryloyl group represented by the following general formula (1) or the following general formula (2).

$$-O-C(=O)-C(R^1)=CH_2 \quad (1)$$

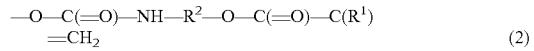

$$-O-C(=O)-NH-R^2-O-C(=O)-C(R^1)=CH_2 \quad (2)$$

where $R^1$ is a hydrogen atom or a methyl group, and $R^2$ is a divalent hydrocarbon group.

<3> The adhesive composition according to <1> or <2>, wherein a weight ratio of the polyoxypropylene-based polymer (A) to the methacrylate compound (B) is 80/20 to 20/80.

<4> The adhesive composition according to any one of <1> to <3>, wherein the methacrylate compound (B) is isobornyl methacrylate.

<5> The adhesive composition according to any one of <1> to <4>, wherein the organic peroxide (C) is at least one peroxide selected from the group consisting of hydroperoxides and benzoyl peroxides.

<6> The adhesive composition according to <1> to <5>, wherein an amount of the organic peroxide (C) added is 1 part by weight to 10 parts by weight relative to 100 parts by weight of the component (A).

<7> The adhesive composition according to <1> to <6>, wherein an amount of the reducing agent (D) contained is 0.1 parts by weight to 10 parts by weight relative to 100 parts by weight of the component (A).

<8> A room-temperature curing adhesive containing the adhesive composition according to any one of <1> to <7>.

<9> A cured product obtained by curing the adhesive composition according to any one of <1> to <7> or the room-temperature curing adhesive according to <8>.

Advantageous Effects of Invention

An aspect of the present invention makes it possible to achieve an adhesive composition which may provide a cured product having excellent mechanical properties.

DESCRIPTION OF EMBODIMENTS

An embodiment of the present invention will be described in detail. Note that any numerical range expressed as "A to B" in the present specification means "not less than A and not more than B" unless otherwise stated. All literatures listed in the present specification are incorporated herein by reference.

[1. Adhesive Composition]

An adhesive composition (hereinafter, referred to as "the present adhesive composition") in accordance with an embodiment of the present invention contains: a polyoxypropylene-based polymer (A) which has, at a terminal thereof, not less than 0.6 (meth)acryloyl groups on average and which has a number average molecular weight of not less than 5,000; a methacrylate compound (B) having a glass transition temperature of higher than 60° C. in a state of a homopolymer; an organic peroxide (C); and a reducing agent (D).

As described above, the inventors of the present invention successfully produced a cured product having more excellent mechanical properties than those of conventional cured products by curing, through Redox radical reaction, an adhesive composition containing a specific polyoxypropylene-based polymer and a methacrylate compound having a high glass transition temperature (Tg) in a state of a homopolymer. The technique that improves both a strength and elongation of the cured product on the basis of such an idea has not been achieved and is surprising.

(1-1. Polyoxypropylene-Based Polymer (A))

A polyoxypropylene-based polymer (A) in the present adhesive composition has a number average molecular weight of not less than 5,000 and has not less than 0.6 (meth)acryloyl groups on average at the terminal thereof. Hereinafter, the polyoxypropylene-based polymer (A) is also referred to as "component (A)".

The component (A) has a number average molecular weight of not less than 5,000, preferably not less than 8,000, more preferably not less than 10,000, and still more preferably not less than 13,000. When the number average molecular weight of the component (A) is not less than 5,000, the mechanical properties of a resultant cured product are improved. The number average molecular weight has an upper limit which is not particularly limited. The upper limit of the number average molecular weight may however be, for example, not more than 100,000 from the viewpoint of decreasing a viscosity of the component (A) to improve workability. Note that, the number average molecular weight is a polystyrene equivalent value (described in Example below) obtained through GPC. Further, the component (A) may have a linear structure or may have a branched structure.

The average number of the (meth)acryloyl groups that the component (A) has at the terminal thereof is not less than 0.6, preferably not less than 0.8, and more preferably not less than one. In the present specification, the average number of the (meth)acryloyl groups means the average number of (meth)acryloyl groups per molecule.

When the average number of the (meth)acryloyl groups at the terminal of the component (A) is not less than 0.6, curability of a resultant adhesive composition is improved. The number of the (meth)acryloyl group at the terminal of the component (A) has an upper limit which is not particularly limited but may be not more than two on average.

The component (A) has a molecular weight distribution which is not particularly limited but is preferably less than 2.00, more preferably not more than 1.60, still more preferably not more than 1.40, and further still more preferably not more than 1.30. When the molecular weight distribution is less than 2.00, the viscosity of the component (A) is decreased, resulting in improvement of workability. The molecular weight distribution of the component (A) has a lower limit which is not particularly limited but may be, for example, not less than 1.05.

The component (A) preferably has a (meth)acryloyl group represented by the following general formula (1) or the following general formula (2).

$$—O—C(=O)—C(R^1)=CH_2 \qquad (1)$$

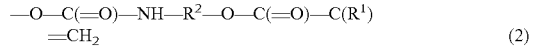

$$—O—C(=O)—NH—R^2—O—C(=O)—C(R^1)=CH_2 \qquad (2)$$

where $R^1$ is a hydrogen atom or a methyl group, and $R^2$ is a divalent hydrocarbon group.

In the general formulas (1) and (2), $R^1$ is a hydrogen atom or a methyl group, preferably a hydrogen atom. When $R^1$ is a hydrogen atom or a methyl group, reactivity of the component (A) is improved. In the general formula (2), $R^2$ is not particularly limited, provided that $R^2$ is a divalent hydrocarbon group. $R^2$ is however preferably a C1 to C10 divalent hydrocarbon group. Examples of such a divalent hydrocarbon group include: an alkylene group, such as a methylene group, an ethylene group, a propylene group, and a hexylene group; a cycloalkylene group, such as a cyclobutylene group, a cyclopentylene group, and a cyclohexylene group; and an arylene group, such as a phenylene group and a benzilene group. Among these examples, the ethylene group and the hexylene group are preferable, the ethylene group is more preferable in view of ease of introduction.

Examples of a method for introducing the (meth)acryloyl group represented by the general formula (1) into the polyoxypropylene-based polymer include (i) a method for reacting a polyoxypropylene-based polymer (a) having a hydroxyl group at the terminal thereof and a compound (H1) having: a functional group that is reactive with this hydroxyl group; and an unsaturated group and (ii) a method for substituting the hydroxyl group of the polyoxypropylene-based polymer (a) with another functional group and reacting the polyoxypropylene-based polymer (a) and a compound (H2) having: a functional group that is reactive with this substituent; and an unsaturated group. Note that the polyoxypropylene-based polymer (a) having a hydroxyl group at the terminal thereof can be prepared by, for example, a method of polymerizing propylene oxide and the like with use of a catalyst such as a zinc hexacyanocobaltate glyme complex, as described in Examples below.

Examples of the compound (H1) to be reacted with the hydroxyl group of the polyoxypropylene-based polymer (a) through the method (i) include: unsaturated acid halogen compounds, such as (meth)acryloyl chloride and (meth)acryloyl bromide; carboxylic acid compounds, such as (meth)acrylic acid; and ester compounds, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, and 2-perfluorohexadecylethyl (meth)acrylate. Among these examples, in view of the reactivity with the hydroxyl group of the polyoxypropylene-based polymer (a), (i) (meth)acryloyl chloride is preferable among the unsaturated acid halogen compounds, (ii) (meth)acrylic acid is preferable among the carboxylic acid compounds, and (iii) methyl (meth)acrylate, ethyl (meth)acrylate, n-propyl (meth)acrylate, isopropyl (meth)acrylate, n-butyl (meth)acrylate, isobutyl (meth)acrylate, and tert-butyl (meth)acrylate are preferable among the ester compounds.

An amount of the compound (H1) used to react with the hydroxyl group of the polyoxypropylene-based polymer (a) is preferably 0.1 molar equivalents to 10 molar equivalents and more preferably 0.5 molar equivalents to 5 molar equivalents, relative to the hydroxyl group. When the amount of the compound (H1) used is not less than 0.1 molar equivalents, reactivity of the hydroxyl group and the compound (H1) is improved. When the amount of the compound (H1) used is not more than 10 molar equivalents, a cost can be reduced.

In the reaction of the polyoxypropylene-based polymer (a) and the compound (H1), various additives (k) can be used.

In a case where the hydroxyl group of the polyoxypropylene-based polymer (a) and the unsaturated acid halogen compounds are reacted with each other, as an additive (k1), an amine compound or the like can be used for capturing a resultant acid. Examples of the amine compound include aliphatic tertiary amines, such as triethylamine, triamylamine, trihexylamine, and trioctylamine; aliphatic unsaturated amines, such as triallylamine and oleylamine; aromatic amines, such as aniline, lauryl aniline, stearyl aniline, and triphenylamine; nitrogen-containing heterocyclic compounds, such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinmethanol, 2-(2-piperidino)ethanol, piperidone, 1,2-dimethyl-1,4,5,6-tetrahydropyrimidine, 1,8-diazabicyclo(5,4,0) undecene-7(DBU), 6-(dibutylamino)-1,8-diazabicyclo(5,4, 0)undecene-7(DBA-DBU), 1,5-diazabicyclo(4,3,0)nonene-5(DBN), 1,4-diazabicyclo(2,2,2)octane(DABCO), and aziridine; and other amines including: amines, such as ethylenediamine, propylene diamine, hexamethylenediamine, N-methyl-1,3-propanediamine, N,N'-dimethyl-1,3-propanediamine, diethylenetriamine, triethylenetetramine, benzylamine, 3-methoxypropylamine, 3-lauryl oxypropylamine, 3-dimethylaminopropylamine, 3-diethylaminopropylamine, 3-dibutylaminopropylamine, 3-morpholinopropylamine, 2-(1-piperazinyl)ethylamine, and xylylenediamine; guanidines, such as guanidine, phenylguanidine, and diphenylguanidine; and biguanides, such as butylbiguanide, 1-o-tolylbiguanide, and 1-phenylbiguanide. Among these examples, tertiary amines are preferable in view of reactivity, and triethylamine is preferable in view of removability after reaction and availability.

An amount of the additive (k1), such as the amine compound, used is preferably 0.1 molar equivalents to 10 molar equivalents and preferably 0.5 molar equivalents to 5 molar equivalents, relative to the hydroxyl group. When the amount of the additive (k1) used is not less than 0.1 molar equivalents, an acid can be sufficiently captured. When the amount of the additive (k1) used is not more than 10 molar equivalents, the additive (k1) can be easily removed.

In a case where the hydroxyl group of the polyoxypropylene-based polymer (a) and the carboxylic acid compounds are reacted with each other, also using, for example, (i) a proton acid and a Lewis acid, (ii) a salt of the amine compound and sulfonic acids, and (iii) a salt of a phosphorus compound and sulfonic acids, as an additive (k2) may lead to higher reactivity. Examples of such an additive (k2) includes: inorganic acids, such as hydrochloric acid, bromic acid, iodic acid, and phosphoric acid; linear saturated fatty acids, such as acetic acid, propionic acid, butyric acid, valeric acid, caproic acid, enanthic acid, caprylic acid, pelargonic acid, capric acid, undecanoic acid, lauric acid, tridecyl acid, myristic acid, pentadecyl acid, palmitic acid, heptadecyl acid, stearic acid, nonadecanoic acid, arachic acid, behenic acid, lignoceric acid, cerotic acid, montanic acid, melissic acid, and lacceric acid; monoene unsaturated fatty acids, such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyene unsaturated fatty acids, such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nisinic acid, and docosahexaenoic acid; branched fatty acids, such as 2-methylbutyric acid, isobutyric acid, 2-ethylbuthyric acid, pivalic acid, 2,2-dimethylbutyric acid, 2-ethyl-2-methylbutyric acid, 2,2-diethylbutyric acid, 2-phenylbutyric acid, isovaleric acid, 2,2-dimethylvaleric acid, 2-ethyl-2-methylvaleric acid, 2,2-diethylvaleric acid, 2-ethylhexanoic acid, 2,2-dimethylhexanoic acid, 2,2-diethylhexanoic acid, 2,2-dimethyloctanoic acid, 2-ethyl-2,5-dimethylhexanoic acid, versatic acid, neodecanoic acid, and tuberculostearic acid; fatty acids having triple bonds, such as propiolic acid, tariric acid, stearolic acid, crepenynic acid, ximenynic acid, and 7-hexadecynoic acid; alicyclic carboxylic acids, such as naphthenic acid, malvalic acid, sterculic acid, hydronocarpic acid, chaulmoogric acid, gorlic acid, 1-methylcyclopentanecarboxylic acid, 1-methylcyclohexanecarboxylic acid, 1-adamantanecarboxylic acid, bicyclo [2.2.2] octane-1-carboxylic acid, and dbicyclo [2.2.1] heptane-1-carboxylic acid; oxygen-containing fatty acids, such as acetoacetic acid, ethoxy acetic acid, glyoxylic acid, glycolic acid, gluconic acid, sabinic acid, 2-hydroxytetradecanoic acid, ipurolic acid, 2-hydroxyhexadecanoic acid, jalapinolic acid, juniperic acid, ambretolic acid, aleuritic acid, 2-hydroxyoctadecanoic acid, 12-hydroxyoctadecanoic acid, 18-hydroxyoctadecanoic acid, 9,10-dihydroxyoctadecanoic acid, 2,2-dimethyl-3-hydroxypropionic acid, ricinoleic acid, kamlolenic acid, licanic acid, ferronic acid, and cerebronic acid; monocarboxylic acids having halogen substituents, such as chloroacetic acid, 2-chloroacrylic acid, and chlorobenzoic acid; chain dicarboxylic acid, such as adipic acid, azelaic acid, pimelic acid, suberic acid, sebacic acid, glutaric acid, oxalic acid, malonic acid, ethylmalonic acid, dimethylmalonic acid, ethylmethylmalonic acid, diethylmalonic acid, succinic acid, 2,2-dimethylsuccinic acid, 2,2-diethylsuccinic acid, and 2,2-dimethylglutaric acid; saturated dicarboxylic acids, such as 1,2,2-trimethyl-1,3-cyclopentanedicarboxylic acid and oxydiacetic acid; unsaturated dicarboxylic acids, such as maleic acid, fumaric acid, acetylenedicarboxylic acid, and itaconic acid; chain tricarboxylic acid, such as aconitic acid, citric acid, isocitric acid, 3-methylisocitric acid, and 4,4-dimethylaconitic acid; aromatic monocarboxylic acid, such as benzoic acid, 9-anthracenecarboxylic acid, atrolactinic acid, anisic acid, isopropylbenzoic acid, salicylic acid, and toluic acid; aromatic polycarboxylic acids, such as phthalic acid, isophthalic acid, terephthalic acid, carboxyphenylacetic acid, and pyromellitic acid; amino acids, such as alanine, leucine, threonine, aspartic acid, glutamic acid, arginine, cysteine, methionine, phenylalanine, tryptophan, and histidine; sulfonic acids, such as trifluoromethanesulfonic acid and p-toluenesulfonic acid; a salt of dimesitylamine and pentafluorobenzenesulfonic acid;

a salt of diphenylamine and trifluoromethanesulfonic acid; and a salt of triphenylphosphine and trifluoromethanesulfonic acid.

An amount of the additive (k2) used is preferably 0.001 molar equivalents to 10 molar equivalents and more preferably 0.01 molar equivalents to 1 molar equivalent, relative to the hydroxyl group. When the amount of the additive (k2) used is not less than 0.001 molar equivalents, a sufficient effect of the additive (k2) can be achieved. When the amount of the additive (k2) used is not more than 10 molar equivalents, the additive (k2) can be easily removed after reaction.

In the method (ii), examples of the polyoxypropylene-based polymer having a substituent other than a hydroxyl group include a polymer having an alkoxide group, a polymer having a halogen atom, and a polymer having an amino group.

Examples of a method for producing the polyoxypropylene-based polymer having an alkoxide group include a method in which the polyoxypropylene polymer (a) and metal alkoxide are reacted with each other. Examples of the metal alkoxide used include sodium methoxide, sodium ethoxide, potassium methoxide, potassium ethoxide, potassium-tert-butoxide, and calcium diethoxide.

As the compound (H2) to be reacted with the polyoxypropylene-based polymer having an alkoxide group, for example, the above-described unsaturated acid halogen compounds or carboxylic acid compounds can be used. Among these, (meth)acryloyl chloride is preferable in view of reactivity of a resultant polyoxypropylene-based polymer.

Examples of a method for producing the polyoxypropylene-based polymer having a halogen atom include: a method in which the polymer (a) is reacted with carbon tetrachloride or carbon tetrabromide in the presence of triphenylphosphine; and a method in which the polymer (a) is reacted with phosphorus pentachloride, thionyl chloride, or sulfuryl chloride, so that the hydroxyl group is substituted with a chlorine atom.

As the compound (H2) which has an unsaturated group and which is to be reacted with the polymer having a halogen atom, for example, salts of carboxylic acid compounds can be used. Examples of such salts include sodium (meth)acrylate and potassium (meth)acrylate.

Examples of a method for producing the polyoxypropylene-based polymer having an amino group include: a method in which the polymer (a) and an amino acid are reacted with each other; a method in which the hydroxyl group of the polymer (a) is substituted with a halogen atom, and the polymer (a) is reacted with hexamethylenetetramine; and a method in which after the polymer (a) in which the hydroxyl group has been substituted with a halogen atom is reacted with (i) a mixture of phthalimide and potassium hydroxide or (ii) potassium phthalimide to obtain a polymer (a') having a phthalimido group, the polymer (a') having the phthalimido group is reacted with hydrazine or potassium hydroxide, so that a polyoxypropylene-based polymer having an amino group is obtained.

As the compound (H2) to be reacted with the polyoxypropylene-based polymer having an amino group, the similar one to the above-described compound (H1) can be used. Further, in the reaction with the compound (H2), the additives (k) may or may not be used.

Examples of a method for synthesizing the polyoxypropylene-based polymer (A) having a structure represented by the general formula (2) include a method in which the polyoxypropylene-based polymer (a) having a hydroxyl group is reacted with an isocyanate-based compound (E).

The isocyanate-based compound (E) is not particularly limited. Examples of the isocyanate-based compound (E) include the following compounds represented by the general formula (3).

$$O=C=N-R^2-O-C(=O)-C(R^1)=CH_2 \quad (3)$$

wherein $R^1$ and $R^2$ are the same as the above-described ones.

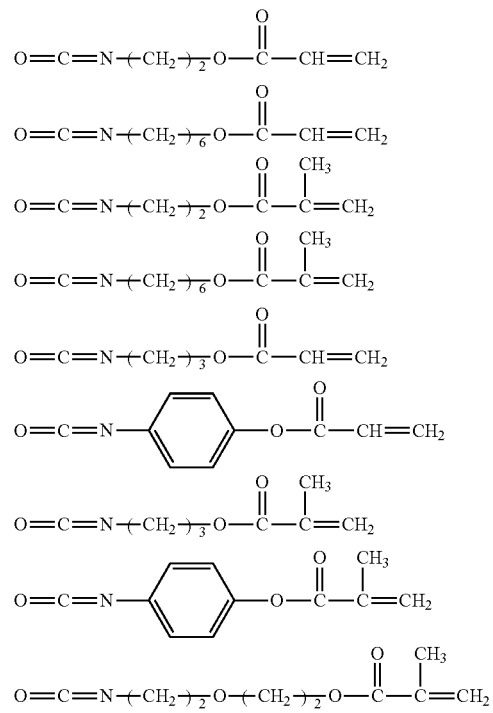

Among these, in view of reactivity and availability, 2-acryloyloxyethylisocyanate and 2-methacryloyloxyethylisocyanate are preferable, and 2-acryloyloxyethylisocyanate is more preferable.

An amount of the isocyanate-based compound (E) used is preferably 0.1 equivalents to 5 equivalents, more preferably 0.5 equivalents to 1.5 equivalents, and still more preferably 0.8 equivalents to 1.0 equivalent, relative to the hydroxyl group of the polyoxypropylene-based polymer (a). When the amount of the isocyanate-based compound (E) used is not less than 0.1 equivalents, curability of a resultant component (A) is improved. When the amount of the isocyanate-based compound (E) used is not more than 5 equivalents, a cost can be reduced.

When the polyoxypropylene-based polymer (a) and the isocyanate-based compound (E) are reacted with each other, dibutyltin(mercapto acid ester) (F) is used. The dibutyltin (mercapto acid ester) (F) is not particularly limited. Examples of the dibutyltin(mercapto acid ester) (F) include dibutyltin(mercapto acid methyl), dibutyltin(mercapto acid ethyl), dibutyltin(mercapto acid n-propyl), dibutyltin(mercapto acid isopropyl), dibutyltin(mercapto acid n-butyl), dibutyltin(mercapto acid isobutyl), dibutyltin(mercapto acid sec-butyl), dibutyltin (mercapto acid tert-butyl), dibutyltin (mercapto acid n-pentyl), dibutyltin(mercapto acid neopentyl), dibutyltin(mercapto acid n-hexyl), dibutyltin(mercapto acid cyclohexyl), dibutyltin (mercapto acid n-heptyl), dibutyltin(mercapto acid n-octyl), dibutyltin(mercapto acid 2-ethylhexyl), dibutyltin(mercapto acid nonyl), dibutyltin (mercapto acid decyl), dibutyltin(mercapto acid dodecyl), dibutyltin (mercapto acid phenyl), dibutyltin(mercapto acid toluyl), and dibutyltin(mercapto acid benzil). More specific examples of the dibutyltin(mercapto acid ester) (F) include NEOSTANN U-360 and NEOSTANN U-350, manufactured by Nitto Chemical Industry Co., Ltd.

An amount of the dibutyltin(mercapto acid ester) (F) used is preferably 10 ppm to 500 ppm, more preferably 25 ppm to 100 ppm, and still more preferably 40 ppm to 60 ppm, relative to the polyoxypropylene-based polymer (a). When the amount of the dibutyltin(mercapto acid ester) (F) used is not less than 10 ppm, reactivity of the dibutyltin(mercapto acid ester) is improved. When the amount of the dibutyltin (mercapto acid ester) (F) used is not more than 500 ppm, by-products are less likely to produce.

When the polyoxypropylene-based polymer (a) and the isocyanate compound (E) are reacted with each other, a solvent may be used. In a case where a solvent is used, a solvent in which the polyoxypropylene-based polymer (a) is soluble is preferable. The solvent is not particularly limited. Examples of the solvent include toluene and hexane. An amount of the solvent used can be determined as appropriate in view of, for example, ease of stirring.

(1-2. Methacrylate Compound (B))

The methacrylate compound (B) in the present adhesive composition has a glass transition temperature (Tg) of higher than 60° C. in a state of a homopolymer. That is, a polymer obtained with use of only the methacrylate compound (B) has a Tg of higher than 60° C. Hereinafter, the methacrylate compound (B) is also referred to as "component (B)".

The component (B) has, in a state of a homopolymer, a Tg of higher than 60° C., preferably not lower than 100° C., more preferably not lower than 140° C., and still more preferably not lower than 180° C. The Tg of the component (B) has an upper limit which is not particularly limited but, realistically, may be not higher than 300° C. When the component (B) has a Tg of higher than 60° C., mechanical properties of a resultant cured product are improved.

An amount of the component (B) used is such that the weight ratio of the component (A) to the component (B) is preferably 80/20 to 20/80, more preferably 70/30 to 30/70, and still more preferably 60/40 to 40/60. When the amount of the component (B) used is not less than 20 in terms of weight ratio relative to a total amount of the component (A) and the component (B), mechanical properties of a resultant cured product are improved. When the amount of the component (B) used is not more than 80 in terms of weight ratio relative to a total amount of the component (A) and the component (B), a decrease in strength of the cured product due to an unreacted component (B) remaining in the cured product is less likely to occur.

The component (B) is not particularly limited. Examples of the component (B) include methyl methacrylate, ethyl methacrylate, dicyclopentenyloxymethacrylate, dicyclopentanyl methacrylate, pentamethylpiperidinylmethacrylate, tetramethylpiperidinylmethacrylate, benzyl methacrylate, phenoxyethyl methacrylate, methoxypolyethylene glycol methacrylate, phenoxyethylene glycol methacrylate, stearyl methacrylate, isobornyl methacrylate, and 4,4-dimercaptodiphenylsulfide dimethacrylate. Among these examples, methyl methacrylate, dicyclopentanyl methacrylate, and isobornyl methacrylate are preferable, and isobornyl methacrylate is more preferable, since a resultant cured product exhibits favorable mechanical properties.

(1-3. Organic Peroxide (C))

The present adhesive composition contains an organic peroxide (C). The organic peroxide (C) is a thermal radical initiator. The organic peroxide (C) and a reducing agent (D) described later act on each other to cause Redox radical reaction. This cures the present adhesive composition. Hereinafter, the organic peroxide (C) is also referred to as "component (C)".

The component (C) is not particularly limited. Examples of the component (C) include: hydroperoxides, such as t-butyl hydroperoxide, p-menthane-hydroperoxide, cumene hydroperoxide, and diisopropylbenzene hydroperoxide; methyl ethyl ketone peroxide; t-butylperoxy laurate; t-butylperoxybenzoate; t-butylperoxy decanoate; and benzoyl peroxides. Among these examples, benzoyl peroxides are preferable since they are excellent in stability. The component (C) may be used solely. Alternatively, two or more components (C) may be used in combination.

An amount of the component (C) added in the present adhesive composition is not particularly limited but, for example, is preferably 1 part by weight to 10 parts by weight, more preferably 1 part by weight to 5 parts by weight, and still more preferably 2 parts by weight to 4 parts by weight, relative to 100 parts by weight of the component (A). When the amount of the component (C) added is not less than 1 part by weight, a curing speed of the cured product is increased. When the amount of the component (C) added is not more than 10 parts by weight, storage stability of the adhesive composition is improved.

(1-4. Reducing Agent (D))

The present adhesive composition contains a reducing agent (D). As described above, the reducing agent reacts with the component (C) to cure the adhesive composition. Hereinafter, the reducing agent (D) is also referred to as "component (D)".

The reducing agent used in the present invention is not particularly limited. Examples of such a reducing agent include vanadyl acetylacetonate, vanadyl stearate, vanadium naphthenate, vanadium acetylacetonate, vanadium benzoylacetonate, cobalt acetylacetonate, copper acetylacetonate, copper naphthenate, cobalt octylate, acetyl-2-thiourea, benzoylthiourea, N,N-diphenylthiourea, N,N-diethylthiourea, N,N-dibutylthiourea, tetramethylthiourea, and N-ethyl-N-2-hydroxyethyl-m-toluidine.

The amount of the component (D) contained is preferably 0.1 parts by weight to 10 parts by weight, more preferably 0.5 parts by weight to 8 parts by weight, and still more preferably 1 part by weight to 5 parts by weight, relative to 100 parts by weight of the component (A). When the amount of the component (D) contained is not less than 0.1 parts by weight, a curing speed of the adhesive composition is increased. When the component (D) is not more than 10 parts by weight, the curing speed of the adhesive composition and storage stability thereof are improved.

(1-5. Others)

The present adhesive composition may contain a plasticizer in order to, for example, adjust physical properties of the adhesive composition and properties thereof. As the plasticizer, used can be one of or a mixture of at least two of substances including: phthalic esters, such as dibutyl phthalate, diheptyl phthalate, di(2-ethylhexyl)phthalate, and butyl benzyl phthalate; non-aromatic dibasic acid esters, such as dioctyl adipate and dioctyl sebacate; esters of polyalkylene glycol, such as diethylene glycol dibenzoate and triethylene glycol dibenzoate; phosphoric esters, such as tricresyl phosphate and tributyl phosphate; paraffin chlorides; and hydrocarbon oils, such as alkyl diphenyl and partially hydrogenated terphenyl.

The amount of the plasticizer contained is preferably 1 part by weight to 100 parts by weight, more preferably 5 parts by weight to 50 parts by weight, and still more preferably 10 parts by weight to 30 parts by weight, relative to 100 parts by weight of the component (A). When the amount of the plasticizer contained is not less than 1 part by weight, a sufficient effect of the plasticizer can be achieved. When the amount of the plasticizer contained is not more than 100 parts by weight, a mechanical strength of a resultant cured product is not excessively reduced, and durability of the resultant cured product is improved.

To the present adhesive composition, various adhesiveness improving agents may be added in order to improve adhesiveness of the adhesive composition with respect to various supports (plastic film, paper, and the like). Examples of the adhesiveness improving agents include: alkylalkoxysilanes, such as methyltrimethoxysilane, dimethyldimethoxysilane, trimethylmethoxysilane, and n-propyltrimethoxysilane; alkylisopropenoxysilanes, such as dimethyldiisopropenoxysilane, methyltriisopropenoxysilane, and γ-glycidoxypropylmethyldiisopropenoxysilane; alkoxysilanes having functional groups, such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)-γ-aminopropyltrimethoxysilane, N-(β-aminoethyl)-γ-aminopropylmethyldimethoxysilane, γ-mercaptopropyltrimethoxysilane, and γ-mercaptopropylmethyldimethoxysilane; acidic phosphate esters, such as monomethylphosphate, dimethyl phosphate, monoethyl phosphate, diethyl phosphate, monobutyl phosphate, dibutyl phosphate, mono-β-chloroethyl phosphate, di-β-chloroethyl phosphate, monoethoxyethyl phosphate, diethoxyethyl phosphate, phenylphosphate, diphenyl phosphate, mono (meth)acryloyloxyethyl phosphate, di(meth)acryloyloxyethyl phosphate, mono(meth)acryloyloxypropyl phosphate, di(meth)acryloyloxypropyl phosphate, and polypropylene glycol mono(meth)acrylate phosphate; silicone varnishes; and polysiloxanes.

The amount of the adhesiveness improving agent(s) contained is preferably 0.1 parts by weight to 50 parts by weight, more preferably 0.5 parts by weight to 25 parts by weight, and still more preferably 1 part by weight to 5 parts by weight, relative to 100 parts by weight of the component (A). When the amount of the adhesiveness improving agent(s) contained is not less than 0.1 parts by weight, a sufficient effect of the adhesiveness improving agents can be achieved. When the amount of the adhesiveness improving agent(s) contained is not more than 50 parts by weight, mechanical properties of a resultant cured product are improved.

The present adhesive composition may contain a filler. The filler can be used, for example, for: improving workability by adjusting a viscosity of a cured product and thixotropy of the adhesive composition; adjusting a strength of the cured product; improving adhesiveness; improving physical properties, such as imparting a chemical resistance; coloring; modifying the surface of the cured product for improving design quality; or reducing a cost per weight.

The filler is not particularly limited. Examples of the filler include: reinforcing fillers, such as fumed silica, precipitated silica, crystalline silica, fused silica, dolomite, silicic anhydride, hydrous silicic acid, and carbon black; fillers, such as calcium carbonate, magnesium carbonate, diatomite, calcined clay, clay, talc, titanium oxide, bentonite, organobentonite, ferric oxide, fine aluminum powder, flint powder, zinc oxide, active zinc oxide, shirasu balloons, glass microballoons, organic microballoons of phenol resin and vinylidene chloride resin, and resin powders, such as PVC powder and PMMA powder; and fibrous fillers, such as glass fibers and filaments. An amount of the filler used is not particularly limited but may be, for example, 1 part by weight to 250 parts by weight relative to 100 parts by weight of the component (A) or may be 10 parts by weight to 200 parts by weight relative to 100 parts by weight of the component (A).

The present adhesive composition may contain a tackifier resin. The tackifier resin is not particularly limited. Examples of the tackifier resin include phenolic resins, modified phenolic resins, cyclopentadiene-phenolic resins, xylene resins, chroman resins, petroleum resins, terpene resins, terpene phenol resins, rosin ester resins, acrylonitrile-butadiene-styrene copolymers (ABS resins), and methyl methacrylate-butadiene-styrene copolymers (MBS resins). More specific examples of the tackifier resin include YS Resin PX, YS Resin PXN, YS Polyster U, YS Polyster T, YS Polyster S, YS Polyster S, Mighty Ace G, Mighty Ace K, YS Resin TO, YS Resin TR, YS Resin SX, Clearon P, Clearon M, and Clearon K, manufactured by YASUHARA CHEMICAL CO., LTD.; ARKON, ESTER GUM, PENSEL, SUPERESTER, TAMANOL, and HIGHPALE, manufactured by ARAKAWA CHEMICAL INDUSTRIES, LTD.; and HARIESTER, NEOTALL, HARIMAC, and HARITAC, manufactured by HARIMA Chemicals Inc. Among these examples, in view of compatibility with the component (A), YS Resin PX, YS Resin PXN, YS Resin TO, YS Resin TR, Clearon P, Clearon M, and Clearon K, which are terpene resins, YS Polyster U, YS Polyster T, YS Polyster S, Mighty Ace G, and Mighty Ace K, which are terpene phenol resins are preferable. Among these, the terpene phenol resins such as YS Polyster U, YS Polyster T, YS Polyster S, Mighty Ace G, and Mighty Ace K are more preferably.

An amount of the tackifier resin contained is preferably 5 parts by weight to 100 parts by weight, more preferably 10 parts by weight to 90 parts by weight, and still more preferably 20 parts by weight to 80 parts by weight, relative to 100 parts by weight of the component (A). When the amount of the tackifier resin contained is not less than 5 parts by weight, a sufficient effect of the tackifier resin can be achieved. When the amount of the tackifier resin contained is not more than 100 parts by weight, a viscosity of the present adhesive composition is not excessively high, resulting in improvement of workability.

The present adhesive composition may contain a stabilizer. The stabilizer can improve long-term storage stability of the present adhesive composition. The stabilizer is not particularly limited. Examples of the stabilizer include radical polymerization inhibitors, such as 2,6-di-t-butyl-4-methylphenol, 2,2-methylenebis(4-methyl-6-t-butylphenol), benzoquinone, hydroquinone, quinhydrone, ethylenediamine tetraacetic acid tetrasodium, oxalic acid, N-methyl-N-nitrosoaniline, and N-nitrosodiphenylamine.

An amount of the stabilizer contained is preferably 0.001 parts by weight to 20 parts by weight, more preferably 0.01 parts by weight to 10 parts by weight, and still more preferably 0.1 parts by weight to 5 parts by weight, relative to 100 parts by weight of the component (A). When the amount of the stabilizer contained is not less than 0.001 parts by weight, a sufficient effect of the stabilizer can be achieved. When the amount of the stabilizer contained is not more than 20 parts by weight, the reaction of the (meth) acryloyl group is not interfered, and reactivity of the adhesive composition is improved.

[2. Room-Temperature Curing Adhesive]

A room-temperature curing adhesive (hereinafter, referred to also as "present adhesive") in accordance with an embodiment of the present invention contains the present adhesive composition.

The present adhesive is preferably a two-liquid mixture type adhesive among room-temperature curing adhesives. In a case where the present adhesive is the two-liquid mixture type adhesive, the present adhesive may contain two types of adhesives, i.e., a main agent and a curing agent.

Further, the present adhesive may contain, as well as the present adhesive composition, other materials that are typically contained in a room-temperature curing adhesive. Examples of such other materials include fillers, thickners, thixotropic agents, flame retardants, defoaming agents, corrosion inhibitors, and stabilizers.

[3. Cured Product]

A cured product (hereinafter, also referred to as "present cured product") in accordance with an embodiment of the present invention is obtained by curing the present adhesive composition or the present adhesive.

A method for curing the present adhesive composition or the present adhesive is Redox radical reaction. The curing through the Redox radical reaction allows a resultant cured product to have more excellent mechanical properties than the conventional curing through UV light irradiation does.

The present cured product obtained by curing the present adhesive composition or the present adhesive has more excellent mechanical properties (strength and elongation) than a cured product obtained by curing a conventional adhesive. Specifically, the present cured product has a strength of preferably not less than 12 MPa, more preferably not less than 14 MPa, and still more preferably not less than 16 MPa. In addition, the present cured product has an elongation percentage of not less than 200%, more preferably not less than 210%, and still more preferably not less than 220%. Note that the strength and the elongation percentage are the values that were measured in a tensile test described in Examples below.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will describe embodiments of the present invention in further detail on the basis of Examples. However, the present invention is not limited by the Examples.

Synthesis Example 1

Propylene oxide was polymerized with use of: polyoxypropylene diol having a molecular weight of approximately 2,000 as an initiator; and a zinc hexacyanocobaltate glyme complex as a catalyst. As a result, obtained was a polyoxypropylene-based polymer (a-1) having a hydroxyl group at a terminal thereof and having a number average molecular weight of 28,500. Note that the number average molecular weight was a polystyrene equivalent molecular weight measured with use of (i) HLC-8120GPC (manufactured by TOSOH CORPORATION) as a solution sending system, (ii) TSK-GEL H type (manufactured by TOSOH CORPORATION) as a column and (iii) tetrahydrofuran as a solvent.

Synthesis Example 2

To 100 parts by weight of the polyoxypropylene-based polymer (a-1) which had a hydroxyl group at the terminal thereof and which had been obtained in Synthesis Example 1, (i) 355 parts by weight of acetone, (ii) 0.01 parts by weight of 4-hydroxy-2,2,6,6-tetramethylpiperidine-1-oxy, and, as an additive (k1), (iii) 2.0 parts by weight of triethylamine were added, and the mixture was cooled in an ice water bath. Subsequently, 1.8 parts by weight of acryloyl chloride was dropped as a compound (H1), and the mixture was stirred for 3 hours. After the stirring had ended, devolatilization was performed under reduced pressure to remove acetone. A resultant product was dissolved in tetrahydrofuran and was then cleaned through a separation process with use of an aqueous sodium hydrogen carbonate solution and an aqueous sodium chloride solution. To an extracted organic layer, magnesium sulfate was added. The organic layer was then dried. After that, magnesium sulfate was removed through filtration. Subsequently, to the filtrate, 0.01 parts by weight of 4-hydroxy-2,2,6,6-tetramethylpiperidine-1-oxy was added. The mixture was then subjected to devolatilization under reduced pressure while being heated to 100° C. Through measurement with use of $^1$H-NMR (AvanceIII 400 MHz NMR system manufactured by Bruker), it was confirmed that a peak derived from the hydroxyl group of the polyoxypropylene-based polymer (a-1) disappeared, and a peak (5.10 ppm (multiplet)) derived from a proton on carbon combined with an acryloyloxy group appeared. Thus, it was confirmed that a polyoxypropylene-based polymer (A-1) having an acryloyloxy group was obtained.

A rate at which the acryloyloxy group was introduced was calculated from a ratio of an integral value of a peak derived from a methyl group in a main chain on a $^1$H-NMR spectrum and an integral value of a peak derived from a proton on carbon combined with the acryloyloxy group on a $^1$H-NMR spectrum. In the polyoxypropylene-based polymer (A-1) thus obtained, a rate at which the acryloyloxy group was introduced was 80%. Accordingly, it was found that the polyoxypropylene-based polymer (A-1) contains 1.6 acryloyloxy groups on average per molecule. Further, the polyoxypropylene-based polymer (A-1) had a number average molecular weight of 28,500, measured through GPC. Note that the polyoxypropylene polymer (A-1) had a structure represented by the above general formula (1).

Synthesis Example 3

Used was a polyoxypropylene-based polymer (a-2) which had a hydroxyl group at the terminal thereof and had a number average molecular weight of 14,500 and which had been obtained through the same method as Synthesis Example 1. A polyoxypropylene-based polymer (A-2) having an acryloyloxy group at the terminal thereof was obtained through the same method as Synthesis Example 2 except that the amount of triethylamine added was changed to 4.0 parts by weight, and the amount of acryloyl chloride added was changed to 3.6 parts by weight. Further, through the same method as Synthesis Example 2, it was confirmed that the polyoxypropylene-based polymer (A-2) contained 1.6 acryloyloxy group on average per molecule and had a number average molecular weight of 14,500. Note that the polyoxypropylene polymer (A-2) had a structure represented by the above general formula (1).

Example 1

To a disposable cup, (i) the polyoxypropylene-based polymer (A-1) as the component (A), (ii) isobornyl methacrylate (B-1) (manufactured by Shin-Nakamura Chemical Industries Co., Ltd., Tg=180° C.) as the component (B), and (iii)N-ethyl-N-2-hydroxyethyl-m-toluidine (manufactured by Tokyo Chemical Industry Co., Ltd.), which is a reducing agent, as the component (D) were added in accordance with a formula shown in Table 1. The mixture was subsequently stirred with use of a spatula and then was, with use of Awatori Rentaro ARE-310 (manufactured by Thinky Corporation), stirred (1,600 rpm×1.5 minutes) and subjected to defoaming (2,200 rpm×3 minutes). After the defoaming, to the mixture, NYPER NS (manufactured by NOF CORPORATION), which is an organic peroxide was added as a component (C) in accordance with the formula shown in Table 1 and then was stirred with use of a spatula. After that, stirring (1,600 rpm×20 seconds) and defoaming (2,200 rpm×1 minute) were performed with use of said Awatori Rentaro, so that a composition was obtained.

Example 2

A composition was obtained as in Example 1 except that (i) polyoxypropylene-based polymer (A-2) as the component (A) and (ii) isobornyl methacrylate (B-1) as the component (B) were used in accordance with the formula shown in Table 1.

Comparative Example 1

A composition was obtained as in Example 1 except that the component (B) was changed to isobornyl acrylate (B-2) (IBXA manufactured by OSAKA ORGANIC CHEMICAL INDUSTRY LTD., Tg=97° C.).

Comparative Example 2

To a disposable cup, (i) polyoxypropylene-based polymer (A-1) as the component (A), (ii) isobornyl acrylate (B-2) as the component (B), (iii) Omnirad 1173 (manufactured by IGM Resins B.V.) as a photoradical polymerization initiator, and (iv) Omnirad 819 (manufactured by IGM Resins B.V.) as a photoradical polymerization initiator are added in accordance with a formula shown in Table 2. The mixture was subsequently stirred with use of a spatula and then is, with use of said Awatori Rentaro, stirred (1,600 rpm×1.5 minutes) and subjected to defoaming (2,200 rpm×3 minutes), so that a composition was obtained.

Comparative Example 3

A composition was obtained as in Comparative Example 2 except that (i) polyoxypropylene-based polymer (A-1) as the component (A) and (ii) isobornyl methacrylate as the component (B) were used in accordance with the formula shown in Table 2.

Comparative Example 4

A composition was obtained as in Comparative Example 2 except that (i) polyoxypropylene-based polymer (A-1) as the component (A) and (ii) dicyclopentanyl acrylate (B-3) (FA-513AS manufactured by Hitachi Chemical Co., Ltd., Tg=120° C.) as the component (B) were used in accordance with the formula shown in Table 2.

Comparative Example 5

A composition was obtained as in Comparative Example 2 except that (i) polyoxypropylene-based polymer (A-2) as the component (A) and (ii) dicyclopentanyl acrylate (B-3) as the component (B) were used in accordance with the formula shown in Table 2.

Comparative Examples 6 and 7

A composition was obtained as in Comparative Example 2 except that (i) the polyoxypropylene-based polymer (A-1) as the component (A) and (ii) dicyclopentanyl methacrylate (B-4) (FA-513M manufactured by Hitachi Chemical Co., Ltd., Tg=175° C.) as the component (B) were used in accordance with the formula shown in Table 2.

[Tensile Test]

Tensile tests in Examples and Comparative Examples were performed through the following method.

(Production of Sample for Tensile Test)

Cured products used for tensile tests in Examples 1 and 2 and Comparative Example 1 were prepared through the following method. First, from a NBR sheet having a thickness of 1 mm, molds were cut out to have Type-3 dumb-bell shapes. The molds were then sprayed with a mold release agent. Subsequently, a mold release PET film was put on a glass plate, and, on the mold release PET film, the molds made of NBR were put. The compositions prepared in Examples and Comparative Examples were introduced into the molds having Type-3 dumb-bell shapes, and, on the molds, a mold release PET film was put. After that, the compositions were left to stand for not shorter than a day at a room temperature to be cured, so that cured products were obtained from the compositions.

In addition, cured products used for a tensile test in Comparative Examples 2 to 7 were prepared through the following method. The compositions were poured into molds made of polypropylene so as to have thicknesses of 2 mm and were left to stand to be subjected to defoaming. After that, the compositions were irradiated with UV rays with use of a UV irradiation device (model: LIGHT HAMMER 6, light source: mercury lamp, cumulative amount: 2,000 mJ/cm$^2$) manufactured by Fusion UV Systems, INC. to be cured, so that cured products were obtained from the compositions. From the cured products thus obtained, test pieces having Type-3 dumb-bell shapes were prepared.

(Tensile Test)

With respect to the cured products cut out to have Type-3 dumb-bell shapes, a tensile test was performed with use of an autograph (AG-2000A) manufactured by Shimadzu Corporation under the following conditions: a temperature of 23° C.; a humidity of 55% RH; and a tensile speed of 100 mm/min, and strengths (MPa) at break and elongation percentages (%) at break were measured. The strength at break was a strength at a point in time when the test piece broke. In addition, the elongation percentage at break indicated, as a relative value, a length of the test piece at a point in time when the test piece broke, on the assumption that a length of the test piece at a point in time when the tensile test started was 100%.

[Result]

Table 1 shows compositions in Examples 1 and 2 and results of the tensile test in Examples 1 and 2. Further, Table 2 shows compositions in Comparative Examples 1 to 7 and results of the tensile test in Comparative Examples 1 to 7. Note that, in Tables, "-" means the component was not used.

TABLE 1

|  | Composition (part by weight) | Example 1 | Example 2 |
|---|---|---|---|
| Component A | Polyoxypropylene-based polymer (A-1) | 40 | — |
|  | Polyoxypropylene-based polymer (A-2) | — | 50 |
| Component B | Isobornyl methacrylate (B-1) (Tg = 180° C.) | 60 | 50 |
| Component C | NYPER NS | 2 | 2 |
| Component D | N-ethyl-N-2-hydroxyethyl-m-toluidine | 0.2 | 0.2 |
| Tensile test | Strength at break (MPa) | 18.0 | 18.5 |
|  | Elongation percentage at break (%) | 226 | 290 |

TABLE 2

|  | Composition (part by weight) | Comparative Example 1 | 2 | 3 | 4 | 5 | 6 | 7 |
|---|---|---|---|---|---|---|---|---|
| Component A | Polyoxypropylene-based polymer (A-1) | 40 | 30 | 40 | 67 | — | 30 | 40 |
|  | Polyoxypropylene-based polymer (A-2) | — | — | — | — | 50 | — | — |
| Component B | Isobornyl methacrylate (B-1) (Tg = 180° C.) | — | — | 60 | — | — | — | — |
|  | Isobornyl acrylate (B-2) (Tg = 97° C.) | 60 | 70 | — | — | — | — | — |
|  | Dicyclopentanyl acrylate (B-3) (Tg = 120° C.) | — | — | — | 33 | 50 | — | — |
|  | Dicyclopentanyl methacrylate (B-4) (Tg = 175° C.) | — | — | — | — | — | 70 | 60 |
| Component C | NYPER NS | 2 | — | — | — | — | — | — |
| Component D | N-ethyl-N-2-hydroxyethyl-m-toluidine | 0.2 | — | — | — | — | — | — |
| Photoradical polymerization initiator | Omnirad 1173 | — | 2 | 2 | 2 | 2 | 2 | 2 |
|  | Omnirad 819 | — | 1 | 1 | 1 | 1 | 1 | 1 |
| Tensile test | Strength at break (MPa) | 11.0 | 11.8 | 9.2 | 2.1 | 1.6 | 8.3 | 6.0 |
|  | Elongation percentage at break (%) | 294 | 238 | 209 | 393 | 583 | 3 | 68 |

Tables 1 and 2 show the following. The cured products in Examples 1 and 2 both exhibited high strengths at break and high elongation percentages at break. In contrast, the cured product in Comparative Example 1 in which acrylate was used as the component (B), and the curing was performed through Redox radical reaction was inferior in strength at break to the cured products in Examples 1 and 2. Further, the cured products in Comparative Examples 2, 4, and 5 in which acrylate was used instead of methacrylate as the component (B) were also inferior in strength at break to the cured products in Examples 1 and 2. Furthermore, the cured products in Comparative Examples 3, 6, and 7 which did not cause Redox reaction were inferior in both strength at break and elongation percentage at break to the cured products in Examples 1 and 2.

Therefore, it was found that, with use of an adhesive composition which contained a methacrylate compound having a Tg of higher than 60° C. in a state of a homopolymer and a polyoxypropylene-based polymer having a specific structure and which caused Redox reaction, a resultant cured product exhibited excellent properties in both strength and elongation.

INDUSTRIAL APPLICABILITY

An embodiment of the present invention makes it possible to provide an adhesive composition which enables provision of a cured product having excellent mechanical properties.

Thus, an adhesive composition in accordance with an embodiment of the present invention and a cured product obtained from the adhesive composition can be suitably used for applications, such as adhesives, ink binders, wood chip binders, binders for rubber chips, foam chip binders, binders for castings, rock mass consolidation materials for floor materials and ceramics, paints, coating materials, binders for reinforcing fibers, composite materials, molding materials for 3D printers, materials for lamination with a glass fiber, materials for printed wiring boards, electronic substrates, solder resists, interlayer insulating films, build-up materials, adhesives for FPC, die-bonding materials, underfill materials, semiconductor mounting materials such as ACF, ACP, NCF, and NCP, and sealing materials, and can be more suitably for structural adhesives, in particular, structural adhesives for vehicles.

The invention claimed is:

1. An adhesive composition comprising:
   a polyoxypropylene-based polymer (A) which has, at a terminal thereof, not less than 0.6 (meth)acryloyl groups on average and which has a number average molecular weight of not less than 5,000;
   a methacrylate compound (B) having a glass transition temperature of higher than 60° C. in a state of a homopolymer;
   an organic peroxide (C); and
   a reducing agent (D).

2. The adhesive composition according to claim 1, wherein the polyoxypropylene-based polymer (A) has a (meth)acryloyl group represented by the following general formula (1) or the following general formula (2):

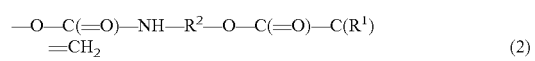

where $R^1$ is a hydrogen atom or a methyl group, and $R^2$ is a divalent hydrocarbon group.

3. The adhesive composition according to claim 1, wherein a weight ratio of the polyoxypropylene-based polymer (A) to the methacrylate compound (B) is 80/20 to 20/80.

4. The adhesive composition according to claim 1, wherein the methacrylate compound (B) is isobornyl methacrylate.

5. The adhesive composition according to claim 1, wherein the organic peroxide (C) is at least one peroxide selected from the group consisting of hydroperoxides and benzoyl peroxides.

6. The adhesive composition according to claim 1, wherein an amount of the organic peroxide (C) added is 1 part by weight to 10 parts by weight relative to 100 parts by weight of the component (A).

7. The adhesive composition according to claim 1, wherein an amount of the reducing agent (D) contained is 0.1 parts by weight to 10 parts by weight relative to 100 parts by weight of the component (A).

8. A room-temperature curing adhesive comprising the adhesive composition according to claim 1.

9. A cured product obtained by curing the adhesive composition according to claim 1.

* * * * *